US011757583B2

(12) United States Patent
Paz et al.

(10) Patent No.: US 11,757,583 B2
(45) Date of Patent: Sep. 12, 2023

(54) DYNAMIC SUB-BAND SELECTION FOR CONTIGUOUS FREQUENCY DOMAIN PILOT ALLOCATION FOR PHASE NOISE MITIGATION

(71) Applicant: QUALCOMM Incorporated, San Diego, CA (US)

(72) Inventors: Daniel Paz, Geva Carmel (IL); Michael Levitsky, Rehovot (IL); Ronen Shaked, Kfar Saba (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/330,116

(22) Filed: May 25, 2021

(65) Prior Publication Data

US 2022/0385419 A1    Dec. 1, 2022

(51) Int. Cl.
*H04L 5/00* (2006.01)
*H04L 1/00* (2006.01)
*H04W 72/02* (2009.01)
*H04W 72/0453* (2023.01)
*H04W 8/24* (2009.01)

(52) U.S. Cl.
CPC .......... *H04L 5/0039* (2013.01); *H04L 1/0003* (2013.01); *H04L 5/0051* (2013.01); *H04W 8/24* (2013.01); *H04W 72/02* (2013.01); *H04W 72/0453* (2013.01)

(58) Field of Classification Search
CPC ... H04L 5/0039; H04L 1/0003; H04L 5/0051; H04L 5/0032; H04L 5/006; H04W 8/24; H04W 72/02; H04W 72/0453; H04W 72/0493
See application file for complete search history.

(56) References Cited

U.S. PATENT DOCUMENTS

2020/0076647 A1 *   3/2020   Zhang ................ H04L 25/0226

FOREIGN PATENT DOCUMENTS

WO    WO-2022192630 A1 *   9/2022
WO    WO-2022197611 A1 *   9/2022

* cited by examiner

*Primary Examiner* — Thai Nguyen
(74) *Attorney, Agent, or Firm* — Procopio, Cory, Hargreaves & Savitch LLP

(57) ABSTRACT

The apparatus may be a UE configured to transmit, to a base station, an indication of a UE capability associated with a contiguous FD pilot; receive, from the base station, an indication of an allocation of one or more frequency sub-bands for a reception of one or more contiguous FD pilots; and receive, from the base station, the one or more contiguous FD pilots via the one or more frequency sub-bands. The apparatus may be a configured to receive, from a UE, an indication of a UE capability associated with a contiguous FD pilot; select one or more frequency sub-bands for a transmission of a contiguous FD pilot; transmit, to the UE, an indication of an allocation of the one or more frequency sub-bands for the transmission of the contiguous FD pilot; and transmit, to the UE, the contiguous FD pilot via the one or more frequency sub-bands.

28 Claims, 13 Drawing Sheets

DYNAMIC SUB-BAND SELECTION FOR CONTIGUOUS FREQUENCY DOMAIN PILOT ALLOCATION FOR PHASE NOISE MITIGATION

TECHNICAL FIELD

The present disclosure relates generally to communication systems, and more particularly, to a contiguous frequency domain (FD) pilot (e.g., an enhanced phase tracking reference signal (ePTRS)).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5G NR, for high carrier frequency phase noise (PN) may be a dominant impairment that limits a maximum achievable throughput. PN is a multiplicative process in a time domain that may result in a cyclic convolution of the PDSCH with the corresponding PN taps in an FD. Uncompensated PN may lead to common phase error (CPE) and inter-carrier-interference (ICI) related error/noise floor (e.g., a lowest achievable error rate or noise level) that can be significant in some scenarios when the integrated PN (IPN) is strong enough. In some aspects of wireless communication, a phase tracking reference signal (PT-RS) may be used to perform CPE estimation and correction but cannot be used to perform ICI estimation and correction. Thus, an uncompensated ICI may lead to an error floor (e.g., a lowest achievable error rate or noise level) that will limit the maximal throughput even after PT-RS based CPE estimation and correction (e.g., by limiting the highest operational modulation and coding scheme (MCS)). Lack of mitigation of PN related ICI also limits a maximal operational modulation order for mmW (e.g., 1 kQAM and even 256QAM for some PN mask scenarios). The ability to perform CPE and ICI correction for significant PN may enable an increase in the maximum achievable throughput at high SNR (e.g., to increase a throughput that may otherwise be limited because of the non-corrected PN impairments). While CPE may be estimated and corrected based on distributed pilots (e.g., a PT-RS), a contiguous pilot in FD with significant length may be beneficial for ICI estimation and correction.

In an aspect of the disclosure, a method, a computer-readable medium, and an apparatus are provided. The apparatus may be a device at a user equipment (UE). The device may be a processor and/or modem at a UE or the UE itself. The UE may be configured to transmit, to a base station, an indication of a UE capability associated with a contiguous FD pilot; receive, from the base station, an indication of an allocation of one or more frequency sub-bands for a reception of one or more contiguous FD pilots; and receive, from the base station, the one or more contiguous FD pilots via the one or more frequency sub-bands. The UE may further be configured to perform a phase noise correction based on the received contiguous FD pilot, where performing the phase noise correction includes (1) CPE estimation and correction and (2) ICI estimation and correction.

The apparatus may be a device at a base station. The device may be a processor and/or modem at a base station or the base station itself. The base station may be configured to receive, from a UE, an indication of a UE capability associated with a contiguous FD pilot; select one or more frequency sub-bands for a transmission of one or more contiguous FD pilots; transmit, to the UE, an indication of an allocation of the one or more frequency sub-bands for the transmission of the one or more contiguous FD pilots; and transmit, to the UE, the one or more contiguous FD pilots via the one or more frequency sub-bands. The base station may further be configured to transmit a configuration for a plurality of frequency sub-bands and a plurality of contiguous FD pilots, where transmitting the indication of the allocation of the one or more frequency sub-bands includes transmitting an indication of one or more frequency sub-bands in the plurality of frequency sub-bands associated with the one or more contiguous FD pilots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
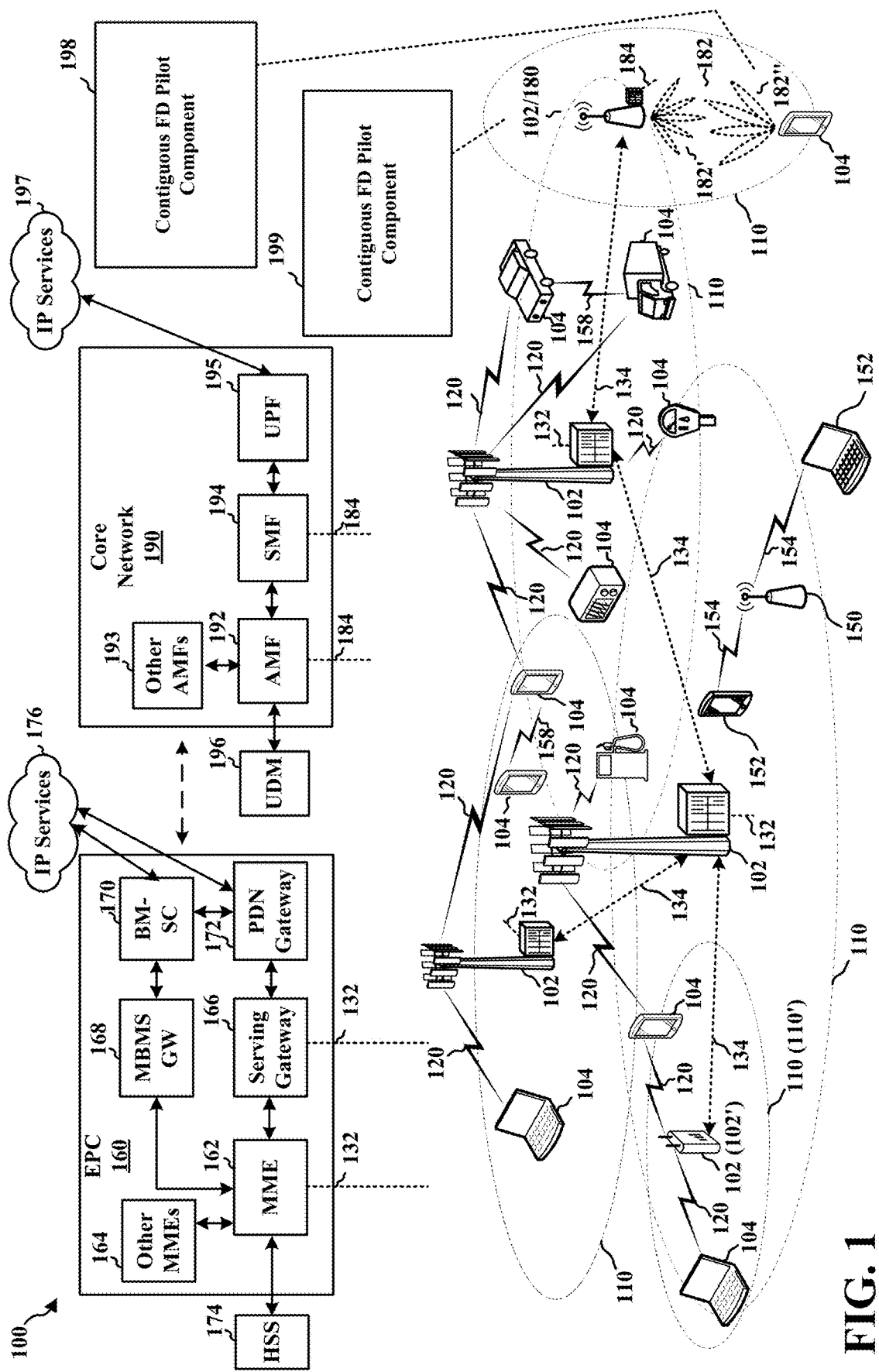
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a contiguous FD pilot component 198 that may be configured to transmit, to a base station, an indication of a UE capability associated with a contiguous FD pilot; receive, from the base station, an indication of an allocation of one or more frequency sub-bands for a reception of a contiguous FD pilot; and receive, from the base station, the contiguous FD pilot via the one or more frequency sub-bands. In certain aspects, the base station 180 may include a contiguous FD pilot component 199 that may be configured to receive, from a UE, an indication of a UE capability associated with a contiguous FD pilot; select one or more frequency sub-bands for a transmission of a contiguous FD pilot; transmit, to the UE, an indication of an allocation of the one or more frequency sub-bands for the transmission of the contiguous FD pilot; and transmit, to the UE, the contiguous FD pilot via the one or more frequency sub-bands. Although the following description may be focused on 5G NR, the concepts described herein may be applicable to other similar areas, such as LTE, LTE-A, CDMA, GSM, and other wireless technologies.

Figure 2:
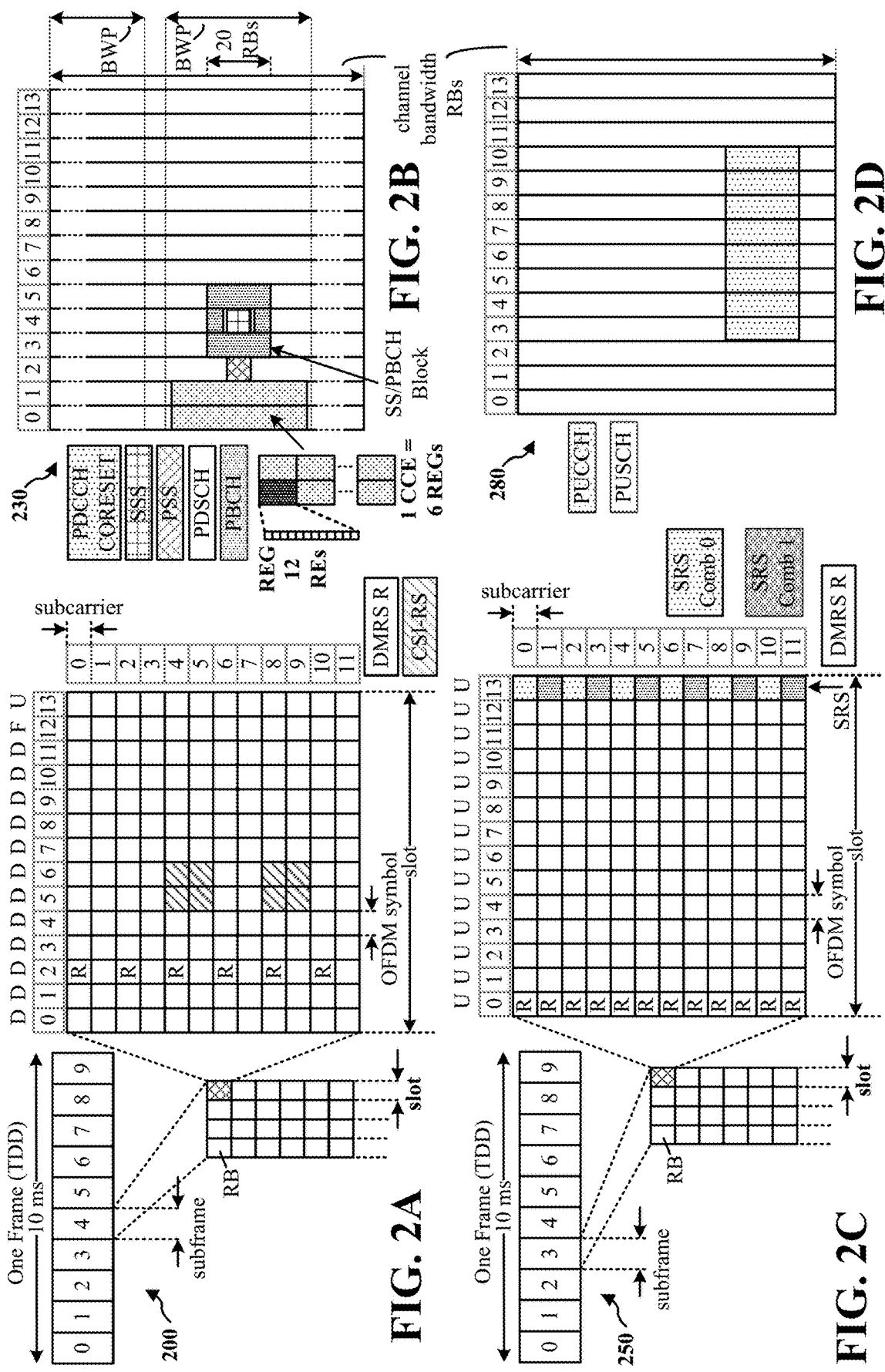
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\mathrm{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
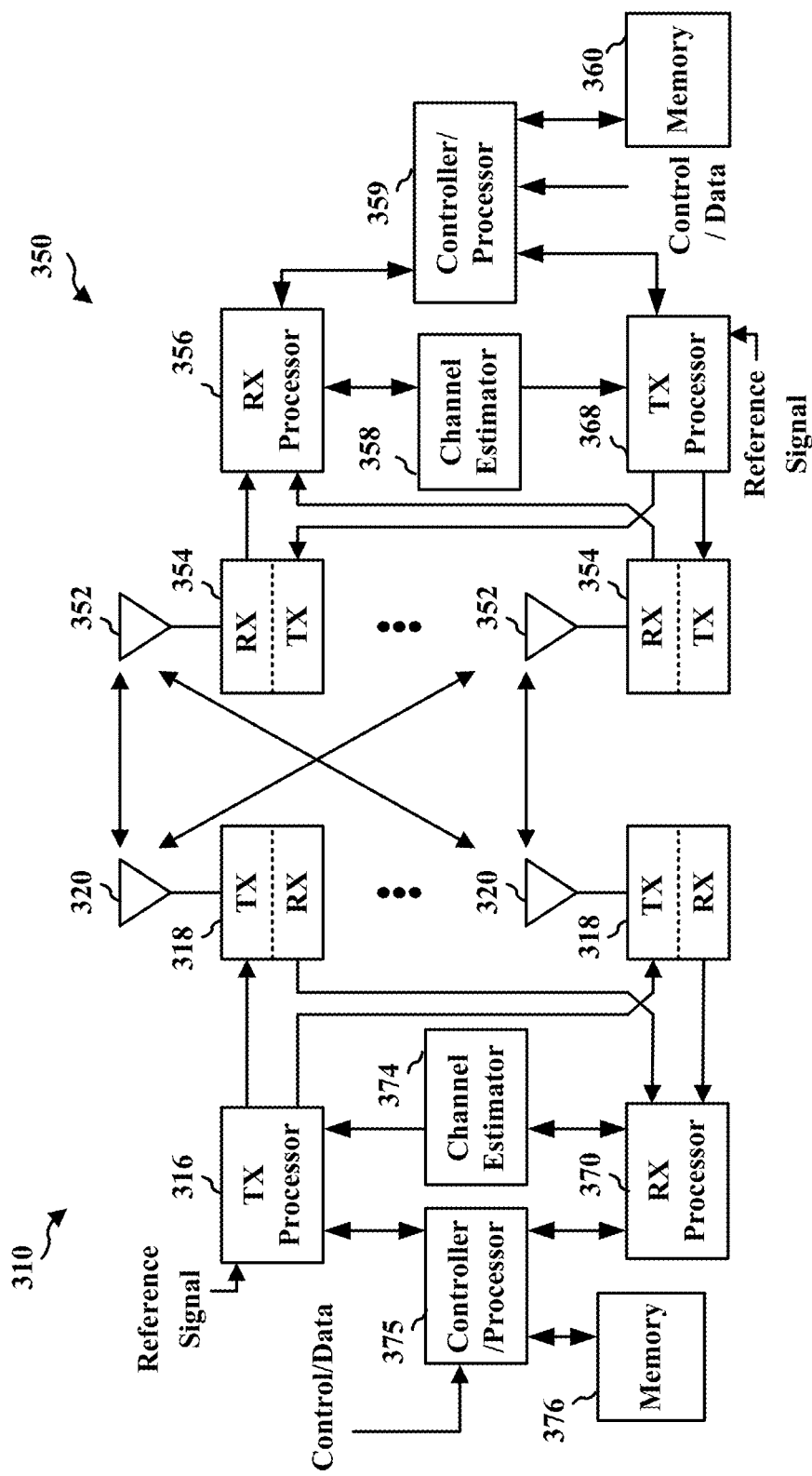
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects of wireless communication, e.g., 5G NR, for high carrier frequency, phase noise (PN) may be a dominant impairment that limits a maximum achievable throughput. Phase noise and residual frequency offset estimation and correction per slot may be performed based on a phase tracking reference signal (PT-RS). In some aspects, the PT-RS may be one of a number of PDSCH pilots and it may be carried by the PDSCH and may be defined by a gold sequence. A millimeter wave (mmW) frame structure may have as few as one DMRS symbol. Based on a single DMRS symbol, a frequency tracking loop may have some residual frequency error and may track a phase that is developed within the slot because of the existing frequency tracking loop (FTL) residual error based on the PTRS.

PN is a multiplicative process in a time domain that may result in a cyclic convolution of the PDSCH with the corresponding PN taps in an FD. Uncompensated PN may lead to CPE and ICI related error/noise floor (e.g., a lowest achievable error rate or noise level) that can be significant in some scenarios when the integrated PN is strong enough. Under reasonable PN mask characteristics, PN related ICI may be more relevant for high SNR regions which are associated with high MCS options and high modulation orders. ICI taps/sequences representing FD PN response may be different per OFDM symbol but are the same for all its REs and may be the same for all antennas (e.g., reception and transmission antennas).

In some aspects of wireless communication, a PT-RS may be used to perform CPE estimation and correction but cannot be used to perform ICI estimation and correction. Thus, an uncompensated ICI may lead to an error floor (e.g., a lowest achievable error rate or noise level) that will limit the maximal throughput even after PT-RS based CPE estimation and correction (e.g., by limiting the highest operational MCS). Lack of mitigation of PN related ICI may also limit a maximal operational modulation order for mmW (e.g., 1 kQAM and even 256QAM for some PN mask scenarios). Accordingly, the ability to perform CPE and ICI correction for significant PN may enable an increase in the maximum achievable throughput at high SNR (e.g., to increase a throughput that may otherwise be limited because of the non-corrected PN impairments).

While CPE may be estimated and corrected based on distributed pilots (e.g., a PT-RS), a contiguous pilot in FD with significant length may be beneficial for ICI estimation and correction. A contiguous dedicated pilot occupying an FD (sub-)band may result in an increased overhead. In order to mitigate the contiguous pilot overhead issue, some aspects may use a data-aided approach for PN mitigation. Data aided PN mitigation may be decomposed into two main components: (1) introducing a waveform which includes a data aided pilot over a selected range of contiguous PDSCH REs and is transmitted with a restricted modulation order and code rate (i.e., restricted MCS index), and (2) a blind estimation and correction of CPE and ICI. The band of REs included the data aided pilot may be referred to as an enhanced phase-tracking reference signal (ePTRS). Each symbol of the ePTRS may include the data so as to reduce overhead. The restriction on the ePTRS MCS index, in some aspects, is done in order to enable reliable decoding of its REs prior to ICI mitigation, such that the ePTRS REs will not be sensitive to a PN related ICI floor.

The blind estimation and correction of CPE and ICI may be based on a four-step data aided approach. A first step may include ePTRS equalization and blind estimation of CPE. A second step may include CPE correction for the ePTRS REs, followed by decoding of the ePTRS data (e.g., using a limited MCS index for the ePTRS such that it is not sensitive to PN ICI impairment). After CPE correction for the ePTRS REs, a third step may include CPE and ICI estimation based on the ePTRS decoded data. If the ePTRS is reliably decoded, the decoded data of the ePTRS may be used as a contiguous pilot for ICI mitigation. Finally, CPE and ICI correction for the PDSCH REs may be performed. The CPE and ICI correction for the PDSCH REs may be performed prior to the PDSCH equalization, demodulation, and decoding. In some aspects, an increased MCS index compared to the ePTRS MCS can be used for the PDSCH as a result of the ICI floor removal. In some cases of a single stream or MIMO (two streams and up), after decoding the (non-ePTRS) PDSCH, data streams are re-modulated and multiplied by the estimated channel (per layer and per Rx based on DMRS). Finally, combining of all the streams gives the reference samples for PN response estimation.

Figure 4:
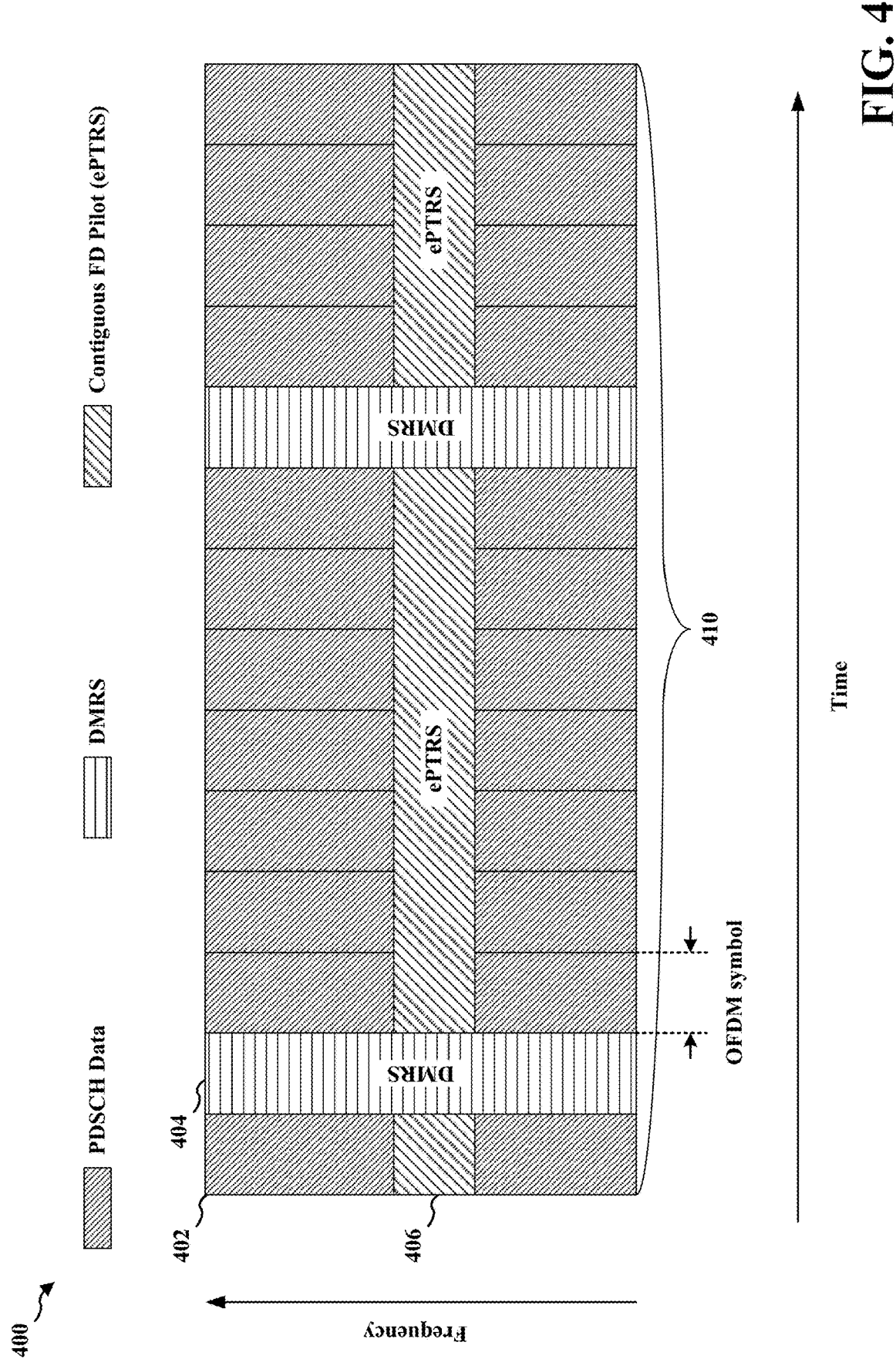
FIG. 4 is a diagram illustrating a contiguous FD pilot in an example DL transmission.

FIG. 4 is a diagram 400 illustrating a contiguous FD pilot (e.g., ePTRS 406) in an example DL transmission 410. Diagram 400 illustrates an ePTRS 406 (e.g., a pilot in a contiguous (sub-)band in FD) that occupies some fraction of a composite allocation for DL transmission (e.g., PDSCH) 410. In some aspects, both the ePTRS 406 and PDSCH data 402 are OFDM modulated. DL transmission 410 may also include DMRS 404. The ePTRS sub-band selection may affect the ePTRS data decoding reliability. A sub-optimal selection may not support the use of a high MCS (e.g., relative to an MCS associated with PDSCH 402), thus increasing the "overhead" (i.e., the amount that throughput is reduced by including the ePTRS 406). Additionally, the ICI estimation accuracy may be affected by the selection of a sub-optimal frequency sub-band as well since it depends on a local frequency selectiveness of the channel. In some aspects, the "overhead" of the proposed scheme is due to the use of a lower MCS for the ePTRS transmission. Accordingly, it may be beneficial to properly select an ePTRS sub-band that allows efficient mitigation of a PN related floor for the remaining PDSCH REs in DL transmission 410.

Figure 5:
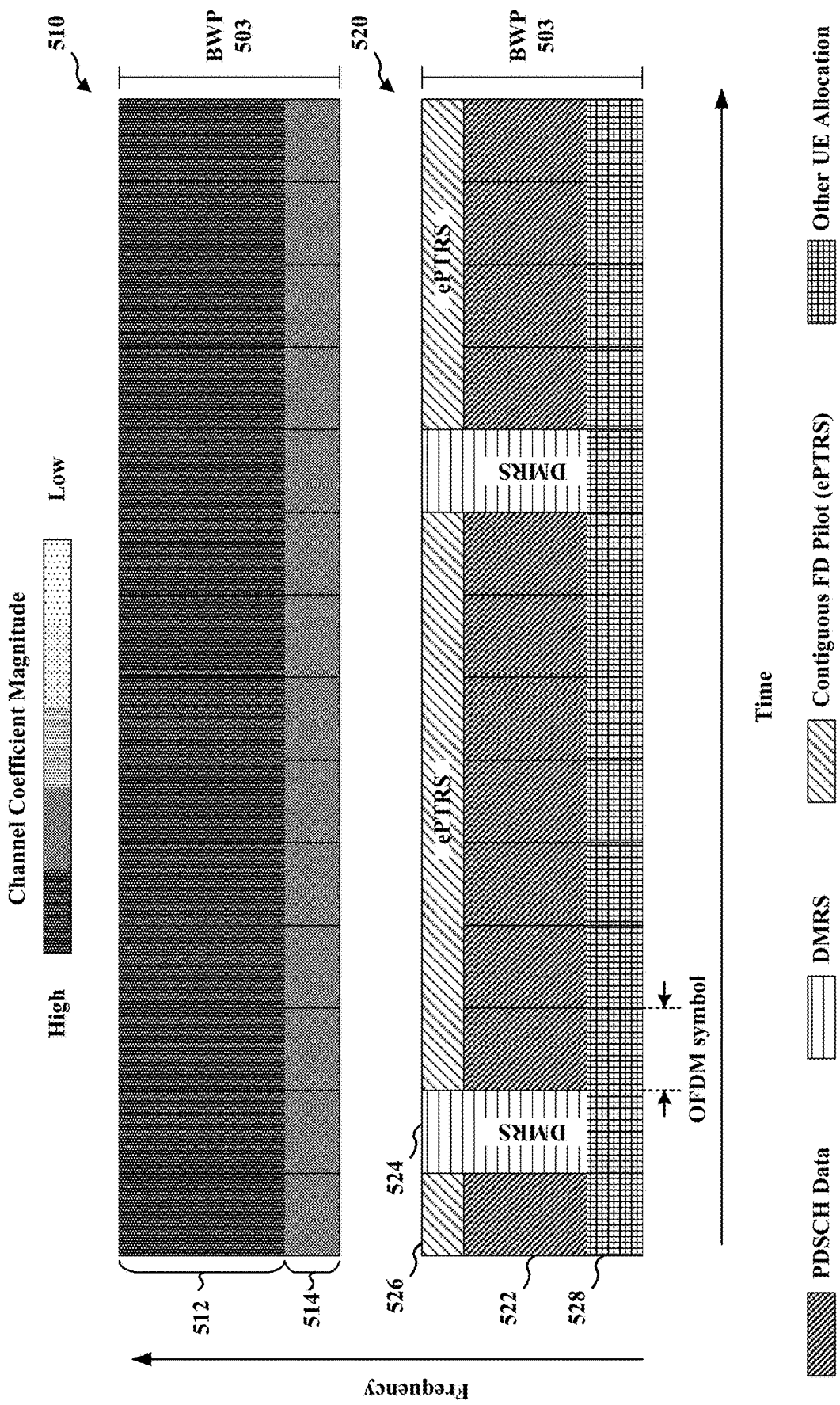
FIG. 5 is a set of diagrams illustrating example channel coefficients for a set of sub-bands and an allocation of DL transmission resources in the set of sub-bands.

FIG. 5 is a set of diagrams 510 and 520 illustrating example channel coefficients for a set of sub-bands (e.g., BWP 503) and an allocation of DL transmission resources in the set of sub-bands (e.g., BWP 503). Diagram 510 illustrates a set of channel coefficient associated with sub-bands in a relatively "flat" channel (e.g., a channel with low delay spread and low Doppler spread over different sub-bands of the channel). Diagram 520 illustrates an example DL transmission resource allocation within the sub-bands in the relatively "flat" channel illustrated in diagram 510. The set of sub-bands 512 may be associated with a high channel coefficient magnitude (e.g., may be a high-quality channel/sub-band capable of supporting a high MCS) while the set of sub-bands 514 may be associated with a slightly lower channel coefficient magnitude. In some aspects, this type of "flat" channel may be found for use cases of high MCS options for customer-premises equipment or for integrated access/backhaul (IAB), where low delay spread and low Doppler (shift and/or spread) may be assumed.

Diagram 520 illustrates a set of time-and-frequency resources allocated for PDSCH 522 data, DMRS 524, ePTRS 526, and transmissions associated with another UE 528 (or device generally). In some aspects, the selected sub-band(s) for transmitting ePTRS 526 may be the illustrated sub-band(s) at the edge of the band and/or component carrier (CC). The edge of the band may be selected to reduce the interference (e.g., ICI) from other (e.g., adjacent) sub-bands. For example, by placing the ePTRS 526 sub-band near a guard band the interference (e.g., ICI) may be primarily from the set of adjacent sub-bands 522 carrying the PDSCH data on one side (e.g., higher or lower frequency sub-bands) with minimal interference (e.g., ICI) from an adjacent guard band (e.g., an unused sub-band that separates resources allocated for different purposes, e.g., for two different UEs) on the other side of the ePTRS 526 sub-band. In contrast, placing the ePTRS 526 sub-band in the middle of the allocated resources may result in interference (e.g., ICI) from adjacent sub-bands on both sides of the ePTRS 526 sub-band. Less interference inflicted from the PDSCH sub-bands 522 on the ePTRS 526 sub-band(s) may increase the accuracy of the ICI estimation.

Figure 6:
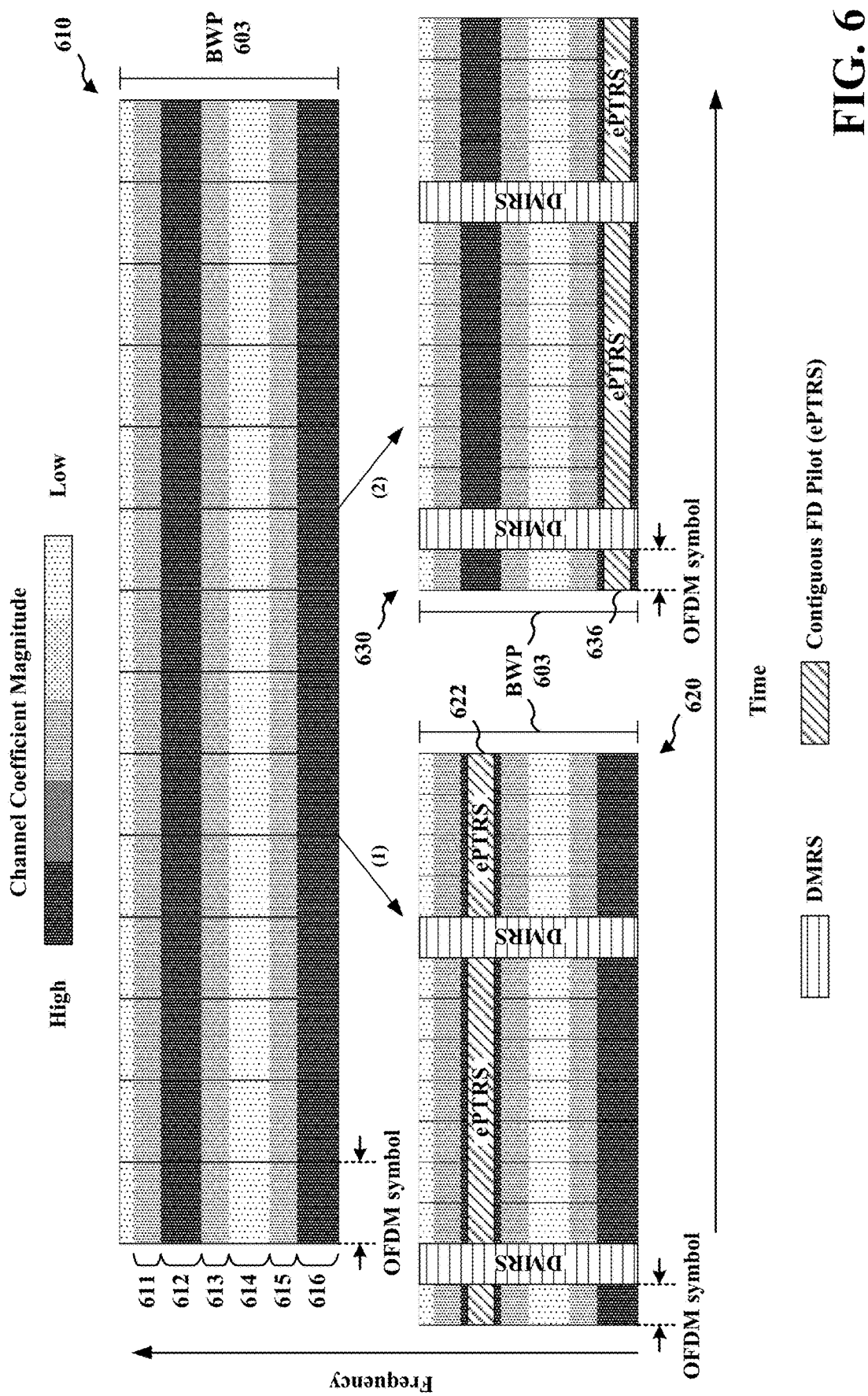
FIG. 6 is a set of diagrams illustrating example channel coefficients for a set of sub-bands and two possible allocations of DL transmission resources in the set of sub-bands.

FIG. 6 is a set of diagrams 610, 620, and 630 illustrating example channel coefficients for a set of sub-bands (e.g., BWP 603) and two possible allocations of DL transmission resources in the set of sub-bands (e.g., BWP 603). Diagram 610 illustrates a set of channel coefficient associated with sub-bands for a channel experiencing fading over its REs. In some aspects, a channel (or sub-band) may experience other impairments, e.g., spur locations, droop characteristics, etc., for which dynamic sub-band selection may be beneficial. Diagram 610 illustrates a set of sub-bands 611-616 with different associated channel coefficients. For example, sub-bands, 611, 613, and 615 may be associated with an intermediate channel coefficient, sub-bands 612 and 616 may be associated with a high channel coefficient, and sub-band 614 may be associated with a low channel coefficient. In some aspects, sub-bands associated with the highest channel coefficients (e.g., a highest SNR) are selected for transmitting a contiguous FD pilot (e.g., an ePTRS). Diagrams 620 and 630 each illustrate a sub-band allocation for ePTRS based on the channel coefficient distribution illustrated in diagram 610. In some aspects, one of the allocations illustrated in diagrams 620 and 630 may be selected based on additional factors (e.g., a higher SNR, greater effects of other impairments affecting the unselected sub-band, etc.).

Diagram 620 illustrates a first example DL transmission resource allocation within the sub-bands in the channel illustrated in diagram 610. The sub-band 612 may be associated with a high channel coefficient magnitude (e.g., may be a high-quality channel/sub-band capable of supporting a high MCS). Accordingly, sub-band for ePTRS 622 may be allocated for ePTRS transmission over any of sub-bands 611, 613, 614, and 615.

Similarly, diagram 630 illustrates a second example DL transmission resource allocation within the sub-bands in the channel illustrated in diagram 610. The sub-band 616 may be associated with a high channel coefficient magnitude (e.g., may be a high-quality channel/sub-band capable of supporting a high MCS). Accordingly, sub-band for ePTRS 636 may be allocated for ePTRS transmission over any of sub-bands 611, 613, 614, and 615. In the examples illustrated in diagrams 620 and 630, sub-band 612 or sub-band for ePTRS 622 (or 616 or sub-band for ePTRS 636) may be selected over sub-band 616 (or 612) based on one of multiple other factors such as which sub-band is less faded/frequency selective, spur locations, droop characteristics, proximity to a band-edge (e.g., a guard band), or other impairments. The selection may be configured/signaled in a dynamic manner such that, at a first time, sub-band 612 may be selected for ePTRS transmission (ePTRS 622), and, at a second time, sub-band 616 may be selected for ePTRS transmission (ePTRS 636).

Figure 7:
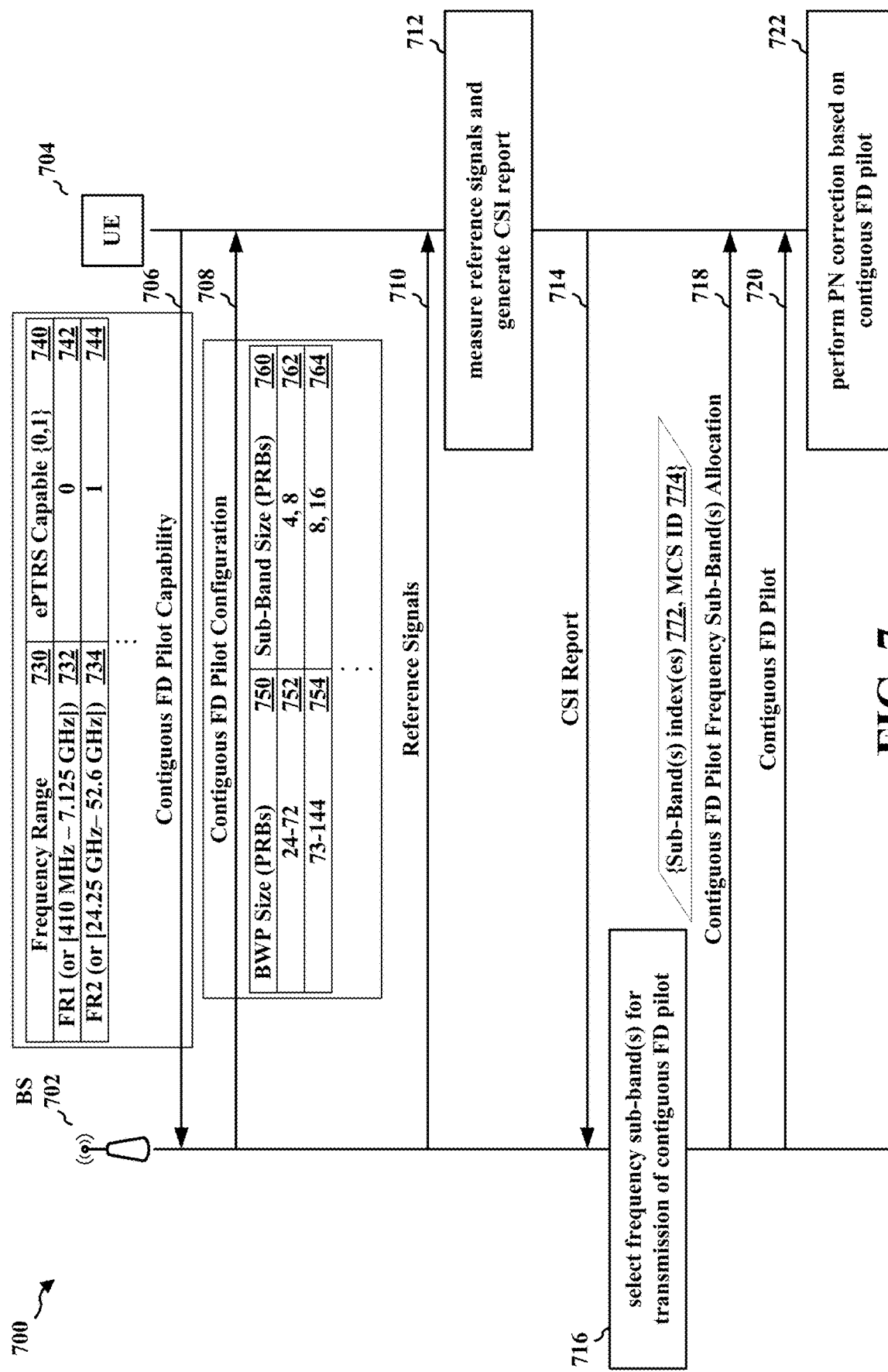
FIG. 7 is a call flow diagram illustrating configuration and signaling related to a contiguous FD pilot.

FIG. 7 is a call flow diagram 700 illustrating configuration and signaling related to a contiguous FD pilot. The UE 704 may transmit, and the base station 702 may receive, an indication (e.g., contiguous FD pilot capability 706) of a capability related to one or more contiguous FD pilots in one or more frequency bands (or sub-bands). For example, diagram 700 illustrates that the contiguous FD pilot configuration may include a set of frequency ranges 730 and associated contiguous FD pilot (ePTRS) capabilities 740. The frequency ranges 730 may include a first frequency range (e.g., FR1) 732 associated with an indication 742 (e.g., a bit) that the UE is not capable of supporting a contiguous FD pilot. The frequency ranges 730 may include a second frequency range (e.g., FR2) 734 associated with an indication 744 (e.g., a bit) that the UE is capable of supporting a contiguous FD pilot. The frequency ranges 730 may be identified by an index or by a frequency range.

The base station 702 may transmit, based on the contiguous FD pilot capability 706, a contiguous FD pilot configuration 708. The contiguous FD pilot configuration 708 may be transmitted based on an indication that the UE supports a contiguous FD pilot for at least one frequency range 730 (e.g., a frequency band or sub-band). The contiguous FD pilot configuration 708 may include a set of BWP sizes (e.g., in PRBs) 750 and associated sub-band size(s) 760. For example, the contiguous FD pilot configuration 708 may identify a BWP size 752 (e.g., a BWP that is between 24 and 72 PRBs in size) and an associated a sub-band size 762 (e.g., 4 or 8 PRBs) that may be used to identify a sub-band allocated for the contiguous FD pilot. The contiguous FD pilot configuration 708 may also identify at least one additional BWP size 754 (e.g., a BWP that is between 73 and 144 PRBs in size) and an associated a sub-band size 764 (e.g., 8 or 16 PRBs) that may be used to identify a sub-band allocated for the contiguous FD pilot. In some embodiments, the contiguous FD pilot configuration 708 may be transmitted before contiguous FD pilot capability 706 and contiguous FD pilot capability 706 may identify the frequency bands (or sub-bands) for which a contiguous FD pilot is supported.

The base station may transmit a set of reference signals 710 that may be received by the UE 704. The UE 704 may measure 712 the reference signals and generate a channel state information (CSI) report identifying a channel quality (e.g., via a channel coefficient) for a set of sub-bands based on the reference signals. The CSI report 714 may further indicate a frequency sub-band recommendation based on the measured reference signals 710. The UE 704 may transmit, and the base station may receive, the generated 712 CSI report 714. For example, referring to FIGS. 5 and 6, the UE 704 may transmit a CSI report indicating the channel coefficients as illustrated in diagrams 510 and 610.

Based on the CSI report, the base station 702 may select 716 one or more frequency sub-bands for transmission of a contiguous FD pilot (e.g., for one or more BWPs/CCs carrying PDSCH). The frequency sub-band(s) may be selected based on the CSI report 714 along with at least one of multiple other factors (e.g., other channel/sub-band characteristics) such as which sub-band is less faded/frequency selective, spur locations (which may be based on hardware configurations), droop characteristics, proximity to a band-edge (e.g., a guard band), and/or other impairments. For example, referring to FIGS. 5 and 6, The base station 702 may select frequency sub-band 612 or 616 based on the relatively high channel coefficient.

The base station 702 may transmit, and UE 704 may receive, contiguous FD pilot frequency sub-band(s) allocation 718. The contiguous FD pilot frequency sub-band(s) allocation 718 may indicate the selected frequency sub-band(s) (e.g., via DCI) by an index 772 included in the contiguous FD pilot configuration 708. The contiguous FD pilot frequency sub-band(s) allocation 718 may also indicate an MCS (e.g., via DCI) by an MCS ID 774 for the contiguous FD pilot (e.g., the ePTRS). In some aspects, the inclusion of the contiguous FD pilot in the PDSCH may be implicitly signaled, e.g., for PDSCH with MCS greater than a threshold MCS (e.g., determined based on, or indicated in, the contiguous FD pilot capability 706). The implied indication of the contiguous FD pilot in the PDSCH may be based on an assumption that PN ICI is likely to be significant for an MCS that is higher than the threshold MCS. The MCS of the implicitly signaled contiguous FD pilot may be explicitly signaled (via MCS ID 774), or it may be pre-defined based on the associated PDSCH MCS (e.g., an MCS that is associated with an MCS index that is X values lower than an MCS index associated with the PDSCH MCS, where X is a predefined value or is based on the MCS index).

The contiguous FD pilot frequency sub-band(s) allocation 718 may be indicated, e.g., for cases in which per-slot reconfiguration is not utilized, via a MAC-CE configuration/reconfiguration for relative ePTRS location (as opposed to a PDSCH allocation start). In some aspects, e.g., for a wide-band allocation for mmW or higher bands with relatively "flat" channels, the contiguous FD pilot frequency sub-band(s) allocation 718 may be indicated (as a relative ePTRS location) via RRC configuration (or reconfiguration). Using RRC configuration may cause an ePTRS interruption during the RRC reconfiguration period (e.g., to avoid ambiguity for this parameter). Accordingly, during the RRC reconfiguration period, the PDSCH may be transmitted with a lower MCS index which is not sensitive to PN-related ICI because there is no ePTRS for PN-related ICI mitigation.

The base station 702 may transmit, and UE 704 may receive, the contiguous FD pilot 720 (e.g., along with PDSCH data and reference signals). For example, referring to FIGS. 4-6, the ePTRS 406, 526, 622, or 636 may be transmitted via an indicated frequency sub-band (e.g., indicated via contiguous FD pilot sub-band allocation 718). The UE 704 may then perform PN estimation and correction (e.g., CPE and ICI estimation and correction) based on the received contiguous FD pilot 720.

Figure 8:
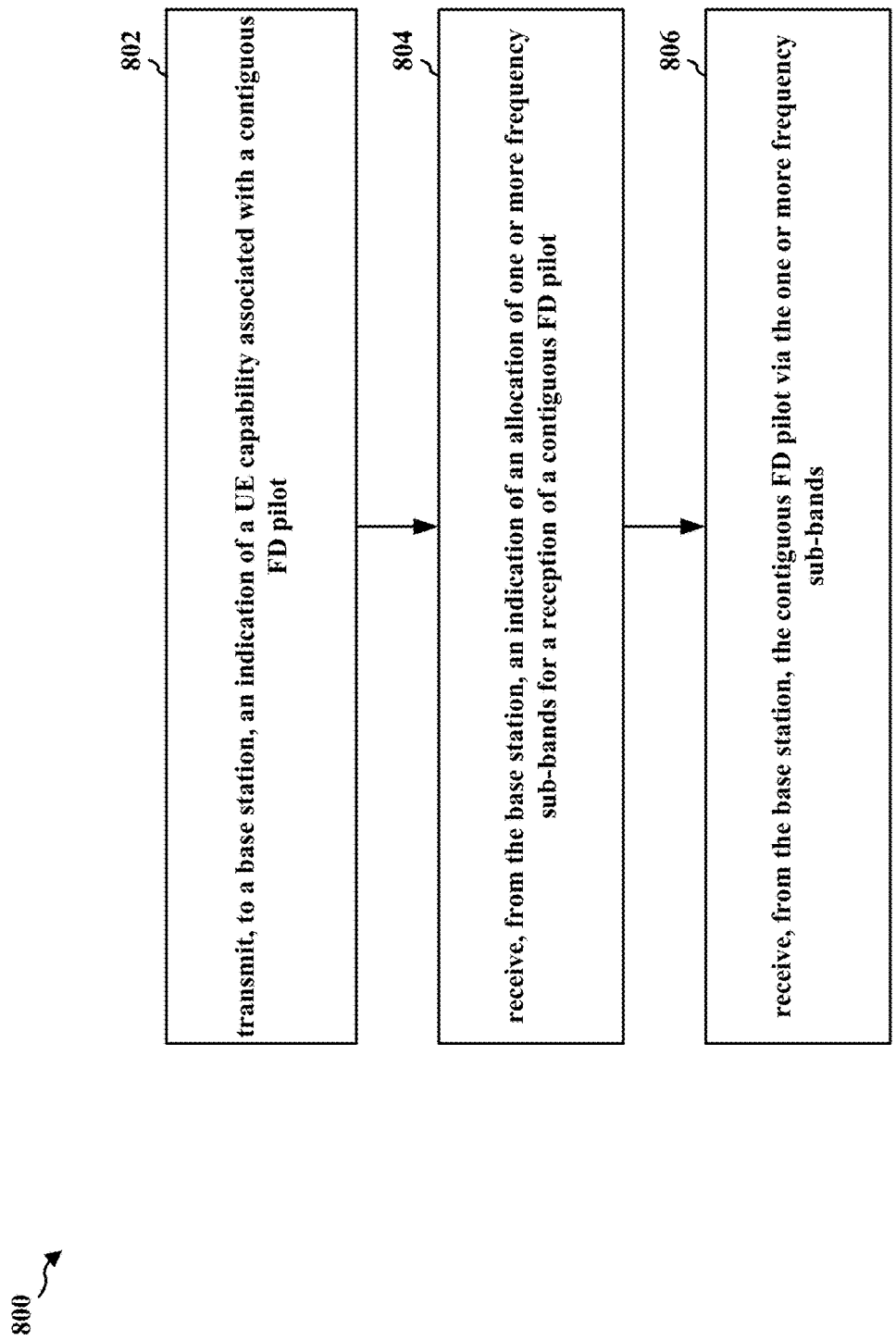
FIG. 8 is a flowchart of a method of wireless communication.
Figure 9:
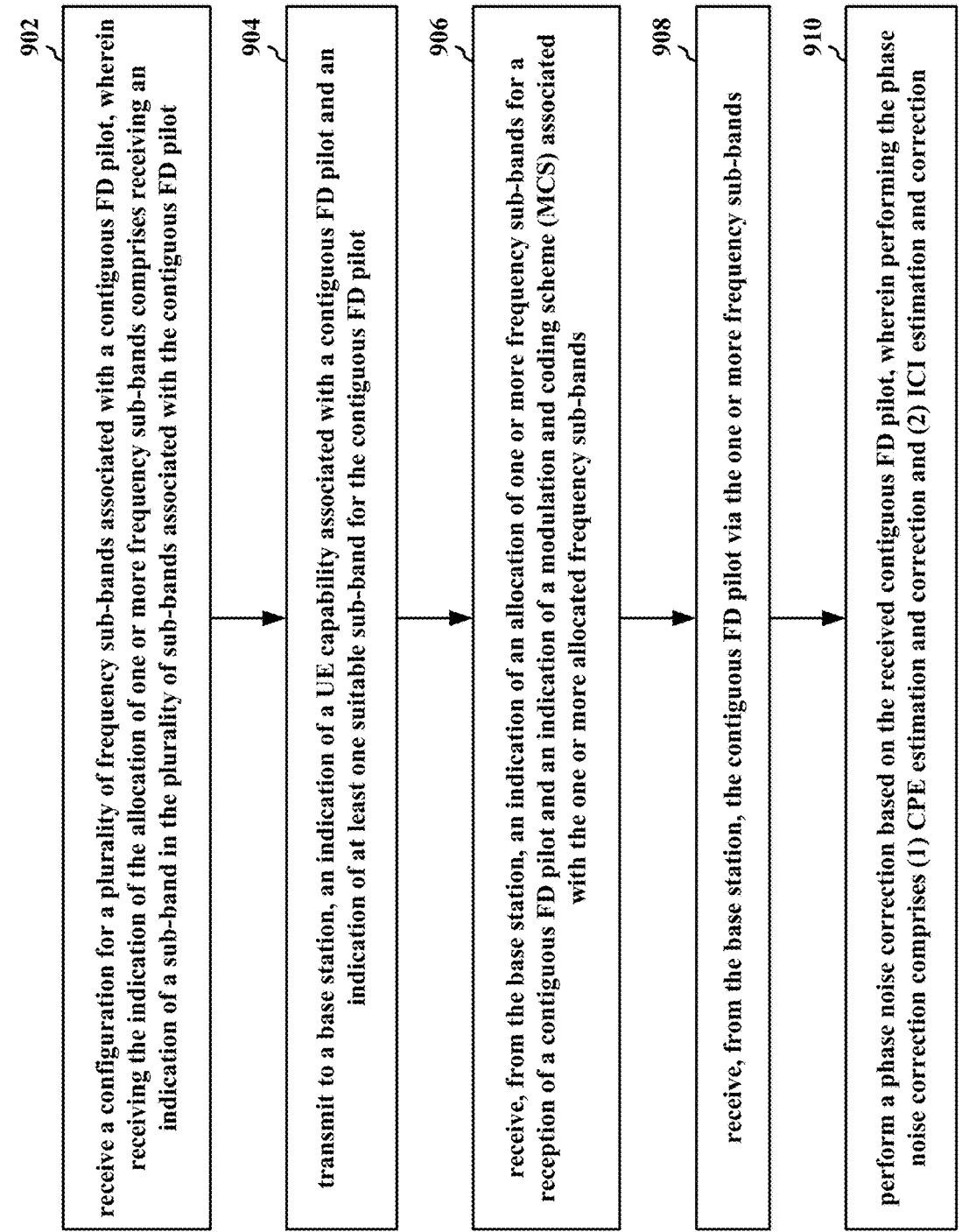
FIG. 9 is a flowchart of a method of wireless communication.

FIG. 8 is a flowchart 800 of a method of wireless communication. The method may be performed by a UE (e.g., the UE 104, 704; the apparatus 1202). Similarly, FIG. 9 is a flowchart 900 of a method of wireless communication. The method may be performed by a UE (e.g., the UE 104, 704; the apparatus 1202). FIGS. 8 and 9 may be performed by a same UE and may represent similar operations that may be discussed together in the following description. The description of FIGS. 8 and 9 may further refer to elements of FIGS. 4-7 to provide non-limiting examples. At 802 and 904, the UE (e.g., UE 704) may transmit, to a base station (e.g., base station 702), an indication of a UE capability associated with a contiguous FD pilot. For example, UE 704 may transmit contiguous FD pilot capability 706 to base station 702. The indication of the UE capability may include an indication of a UE capability associated with the contiguous FD pilot for each of a plurality of frequency bands (e.g., indication 742 associated with frequency range 732 (FR1) and indication 744 associated with frequency range 734 (FR2)). The indication (e.g., 744) for at least a first frequency band (e.g., 734) in the plurality of frequency bands (e.g., 732, 734, etc.) may include an indication of a capability to support ("1") the contiguous FD pilot, while the indication (e.g., 742) for at least a second frequency band (e.g., 732) in the plurality of frequency bands may include an indication of a lack of support ("0") for the contiguous FD pilot. The UE, at 904, may also transmit an indication of at least one recommended sub-band for the contiguous FD pilot. The indication of the at least one recommended sub-band may be transmitted via a CSI report. For example, the UE 704 may transmit CSI report 714 including a recommendation of a particular sub-band or sub-bands with a highest channel coefficient (e.g., a channel quality information (CQI)). For example, 802 and 904 may be performed by ePTRS capability indication component 1240.

At 804 or 906, the UE may receive, from the base station, an indication (e.g., sub-band(s) index(es) 772) of an allocation of one or more frequency sub-bands for a reception of a contiguous FD pilot. For example, the UE 704 may receive contiguous FD pilot frequency sub-band(s) allocation 718 from base station 702. The indicated one or more frequency sub-bands may be selected (e.g., 716) by a base station 702 based on a CSI report (e.g., CSI report 716). The indication (e.g., 718) of the allocation may be received via at least one of a layer 2 (L2) message, a layer 3 (L3) message, RRC signaling, DCI, or a MAC-CE.

The one or more allocated frequency sub-bands for the contiguous FD pilot may include a sub-band (e.g., frequency sub-band for ePTRS 526) adjacent to a guard band. In some aspects, the one or more allocated frequency sub-bands for the contiguous FD pilot may include a frequency sub-band (e.g., sub-band 512 or sub-bands 612 and 616) with a channel coefficient that is greater than a threshold channel coefficient that may be based on a range of channel coefficients associated with frequency sub-bands (e.g., 512 and 514 or 611-616) of a frequency band (e.g., BWP 503 or 603) including the one or more allocated frequency sub-bands (e.g., sub-band for ePTRS 526, sub-band for ePTRS 622, or sub-band for ePTRS 636). In some aspects, the UE receives, at 906, an indication of an MCS (e.g., MCS ID 774) associated with the one or more allocated frequency sub-bands. In some aspects, an MCS associated with the allocated frequency sub-bands is at least one of (1) implicitly signaled based on an MCS of an associated PDSCH and the UE capability indication or (2) pre-defined based on an MCS of an associated PDSCH. For example, 804 and 906 may be performed by ePTRS configuration component 1242.

At 806 or 908, the UE may receive, from the base station, the contiguous FD pilot via the one or more allocated frequency sub-bands. In some aspects, the contiguous FD pilot is an enhanced phase tracking reference signal (ePTRS). For example, UE 704 may receive contiguous FD pilot (ePTRS) 720 from base station 702. The contiguous FD pilot 720 may be decoded based on an associated MCS (e.g., an explicitly indicated MCS or an implicitly indicated MCS). For example, 806 and 908 may be performed by PN estimation and correction component 1244.

In some aspects, the UE may receive, at 902, a configuration for a plurality of frequency sub-bands associated with a contiguous FD pilot. For example, UE 704 may receive contiguous FD pilot configuration 708. For a UE that receives, at 902, a configuration for a plurality of frequency sub-bands associated with a contiguous FD pilot (e.g., 708), the UE may receive, at 804 or 906, the indication of the allocation of one or more frequency sub-bands (e.g., 718) as an indication (e.g., sub-band index 772) of a sub-band in the plurality of sub-bands associated with the contiguous FD pilot. For example, 902 may be performed by ePTRS configuration component 1240.

At 910, the UE may perform a phase noise correction based on the received contiguous FD pilot, where performing the phase noise correction includes (1) CPE estimation and correction and (2) ICI estimation and correction. For example, UE 704 may perform 722 PN (estimation and) correction based on the contiguous FD pilot 720 received from the base station 702 via the resources allocated by allocation 718. For example, 910 may be performed by PN estimation and correction component 1244.

Figure 10:
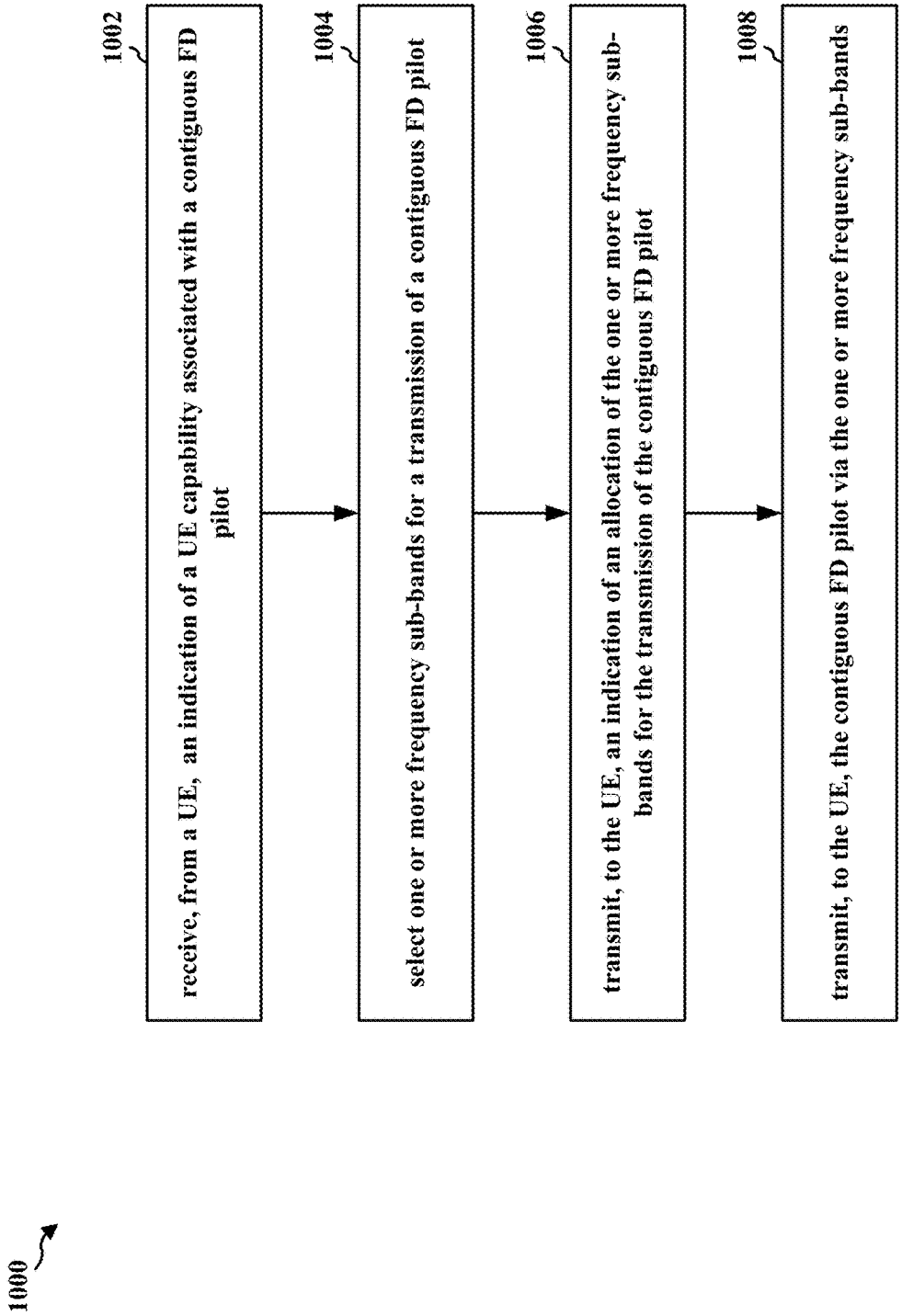
FIG. 10 is a flowchart of a method of wireless communication.
Figure 11:
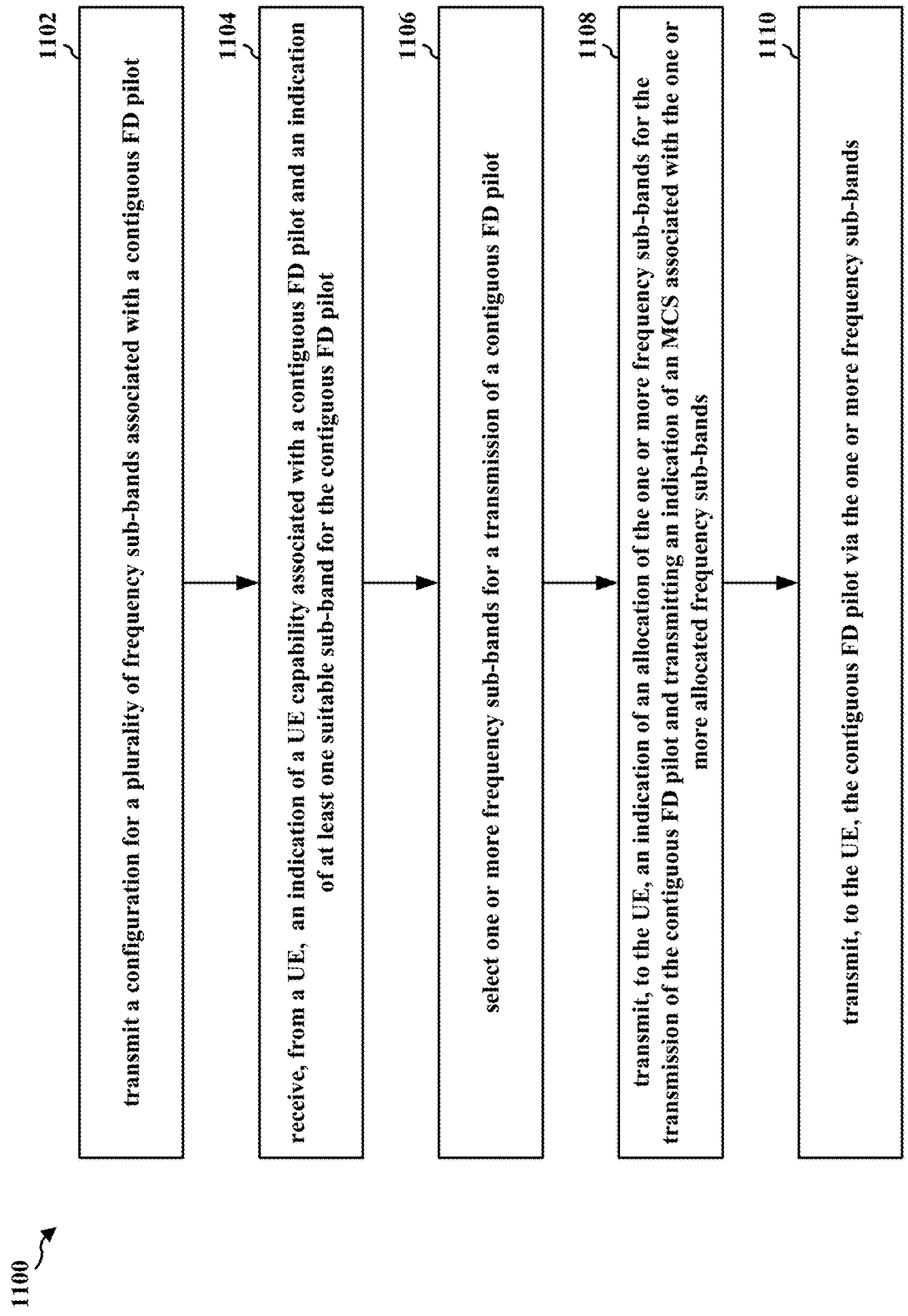
FIG. 11 is a flowchart of a method of wireless communication.

FIG. 10 is a flowchart 1000 of a method of wireless communication. The method may be performed by a base station (e.g., the base station 102, 702; the apparatus 1302). Similarly, FIG. 11 is a flowchart 1100 of a method of wireless communication. The method may be performed by a UE (e.g., the base station 102, 702; the apparatus 1302). FIGS. 10 and 11 may be performed by a same base station and may represent similar operations that may be discussed together in the following description. The description of FIGS. 10 and 11 may further refer to elements of FIGS. 4-7 to provide non-limiting examples. At 1002 and 1104, the base station (e.g., base station 702) may receive, from a UE (e.g., UE 704), an indication of a UE capability associated with a contiguous FD pilot. For example, base station 702 may receive contiguous FD pilot capability 706 from UE 704. The indication of the UE capability may include an indication of a UE capability associated with the contiguous FD pilot for each of a plurality of frequency bands (e.g., indication 742 associated with frequency range 732 (FR1) and indication 744 associated with frequency range 734 (FR2)). The indication (e.g., 744) for at least a first frequency band (e.g., 734) in the plurality of frequency bands (e.g., 732, 734, etc.) may be an indication of a capability to support ("1") the contiguous FD pilot, while the indication (e.g., 742) for at least a second frequency band (e.g., 732) in the plurality of frequency bands may be an indication of a lack of support ("0") for the contiguous FD pilot. The base station, at 1104, may also receive an indication of at least one recommended sub-band for the contiguous FD pilot. The indication of the at least one recommended sub-band may be transmitted via a CSI report. For example, the base station 702 may receive CSI report 714 including a recommendation of a particular sub-band or sub-bands with a highest channel coefficient (e.g., a channel quality information (CQI)). For example, 1002 and 1104 may be performed by ePTRS frequency sub-band selection component 1342.

At 1004 or 1106, the base station may select one or more frequency sub-bands for a transmission of a contiguous FD pilot. The base station may select the one or more frequency sub-bands based on a CSI report. For example, base station 702 may select 716 one or more frequency sub-bands for transmission of a contiguous FD pilot based on contiguous FD pilot capability 706 and the CSI report 714. The selection may be based on additional features and/or characteristics of the BW and/or CC including the selected frequency sub-band for transmitting the contiguous FD pilot. The additional characteristics and/or features may include sub-band fading/frequency selectivity, spur locations (which may be based on hardware configurations), droop characteristics, proximity to a band-edge (e.g., a guard band), and/or other impairments. For example, the one or more frequency sub-bands may be selected from a set of candidate frequency sub-bands in a frequency band based on at least one of (1) a frequency selectivity of each frequency sub-band in the set of candidate frequency sub-bands, (2) spur locations at each frequency sub-band in the set of candidate frequency sub-bands, or (3) amplitude droop characteristics of each frequency sub-band in the set of candidate frequency sub-bands. For example, 1004 and 1106 may be performed by ePTRS frequency sub-band selection component 1342.

At 1006 or 1108, the base station may transmit, to the UE, an indication (e.g., sub-band(s) index(es) 772) of an allocation of one or more frequency sub-bands for a reception of a contiguous FD pilot. For example, the base station 702 may transmit contiguous FD pilot frequency sub-band(s) allocation 718 to UE 704. The indicated one or more frequency sub-bands may be selected (e.g., 716) by the base station 702 based on a CSI report (e.g., CSI report 714). The indication (e.g., 718) of the allocation may be transmitted via at least one of a layer 2 (L2) message, a layer 3 (L3) message, RRC signaling, DCI, or a MAC-CE.

The one or more allocated frequency sub-bands for the contiguous FD pilot may include a sub-band (e.g., frequency sub-band for ePTRS 526) adjacent to a guard band. In some aspects, the one or more allocated frequency sub-bands for the contiguous FD pilot may include a frequency sub-band (e.g., sub-band 512 or sub-bands 612 and 616) with a channel coefficient that is greater than a threshold channel coefficient that may be based on a range of channel coefficients associated with frequency sub-bands (e.g., 512 and 514 or 611-616) of a frequency band (e.g., BWP 503 or 603) including the one or more allocated frequency sub-bands (e.g., sub-band for ePTRS 526, sub-band for ePTRS 622, or sub-band for ePTRS 636). In some aspects, the base station transmits, at 1108, an indication of an MCS (e.g., MCS ID 774) associated with the one or more allocated frequency sub-bands. In some aspects, an MCS associated with the allocated frequency sub-bands is at least one of (1) implicitly signaled based on an MCS of an associated PDSCH and the UE capability indication or (2) pre-defined based on an MCS of an associated PDSCH. For example, 1006 and 1108 may be performed by ePTRS configuration component 1340.

At 1008 or 1110, the base station may transmit, to the UE, the contiguous FD pilot via the one or more allocated frequency sub-bands. In some aspects, the contiguous FD pilot is an enhanced phase tracking reference signal (ePTRS). For example, base station 702 may transmit contiguous FD pilot (ePTRS) 720 to UE 704. The contiguous FD pilot 720 may be decoded based on an associated MCS (e.g., an explicitly indicated MCS or an implicitly indicated MCS). For example, 1008 and 1110 may be performed by ePTRS transmission component 1344.

In some aspects, the base station may transmit, at 1102, a configuration for a plurality of frequency sub-bands associated with a contiguous FD pilot. For example, UE 704 may receive contiguous FD pilot configuration 708. For a base station that receives, at 1102, a configuration for a plurality of frequency sub-bands associated with a contiguous FD pilot (e.g., 708), the base station may transmit, at 1006 or 1108, the indication of the allocation of one or more frequency sub-bands (e.g., 718) as an indication (e.g., sub-band index 772) of a sub-band in the plurality of sub-bands associated with the contiguous FD pilot. For example, 1102 may be performed by ePTRS configuration component 1340.

Figure 12:
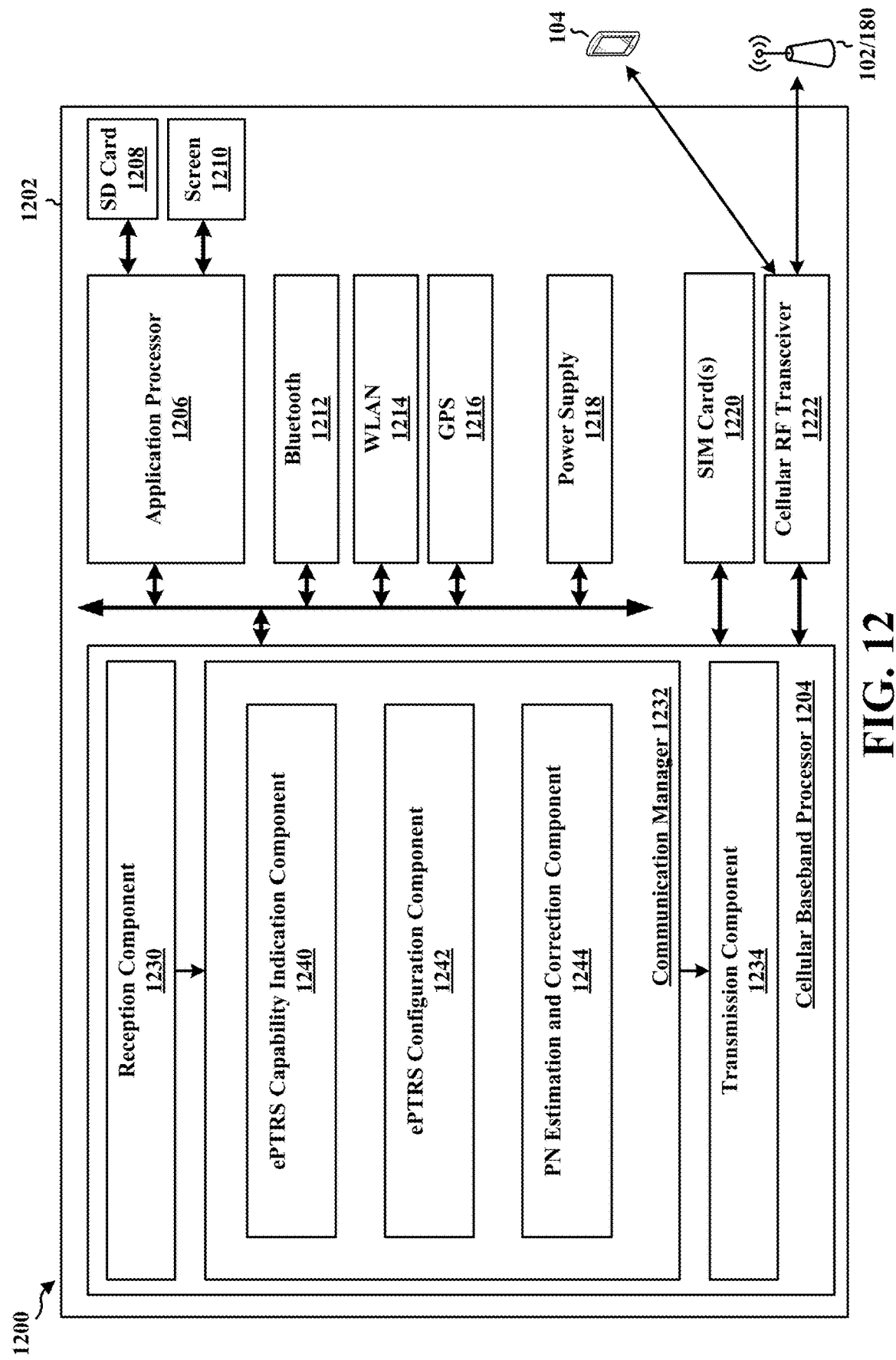
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes an ePTRS capability indication component 1240 that is configured to transmit, to a base station, an indication of a UE capability associated with a contiguous FD pilot, e.g., as described in connection with 802 and 904 of FIGS. 8 and 9. The communication manager 1232 further includes an ePTRS configuration component 1242 that may be configured to receive, from the base station, an indication of an allocation of one or more frequency sub-bands for a reception of a contiguous FD pilot, e.g., as described in connection with 804 and 906 of FIGS. 8 and 9. The communication manager 1232 further includes a PN estimation and correction component 1244 that receives input in the form of an indication of a frequency sub-band allocation (and associated MCS) from the ePTRS configuration component 1242 and is configured to receive, from the base station, the contiguous FD pilot via the one or more allocated frequency sub-bands and perform a phase noise correction based on the received contiguous FD pilot, e.g., as described in connection with 806, 908, and 910 of FIGS. 8 and 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for transmitting, to a base station, an indication of a UE capability associated with a contiguous FD pilot. The apparatus 1202, and in particular the cellular baseband processor 1204, may include means for receiving, from the base station, an indication of an allocation of one or more frequency sub-bands for a reception of a contiguous FD pilot. The apparatus 1202, and in particular the cellular baseband processor 1204, may include means for receiving, from the base station, the contiguous FD pilot via the one or more frequency sub-bands. The apparatus 1202, and in particular the cellular baseband processor 1204, may include means for transmitting an indication of at least one recommended sub-band for the contiguous FD pilot. The apparatus 1202, and in particular the cellular baseband processor 1204, may include means for receiving a configuration for a plurality of frequency sub-bands associated with a contiguous FD pilot, where receiving the indication of the allocation of one or more frequency sub-bands includes receiving an indication of a sub-band in the plurality of sub-bands associated with the contiguous FD pilot. The apparatus 1202, and in particular the cellular baseband processor 1204, may include means for receiving an indication of an MCS associated with the one or more allocated frequency sub-bands. The apparatus 1202, and in particular the cellular baseband processor 1204, may include means for performing a phase noise correction based on the received contiguous FD pilot, where performing the phase noise correction includes (1) CPE estimation and correction and (2) ICI estimation and correction. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
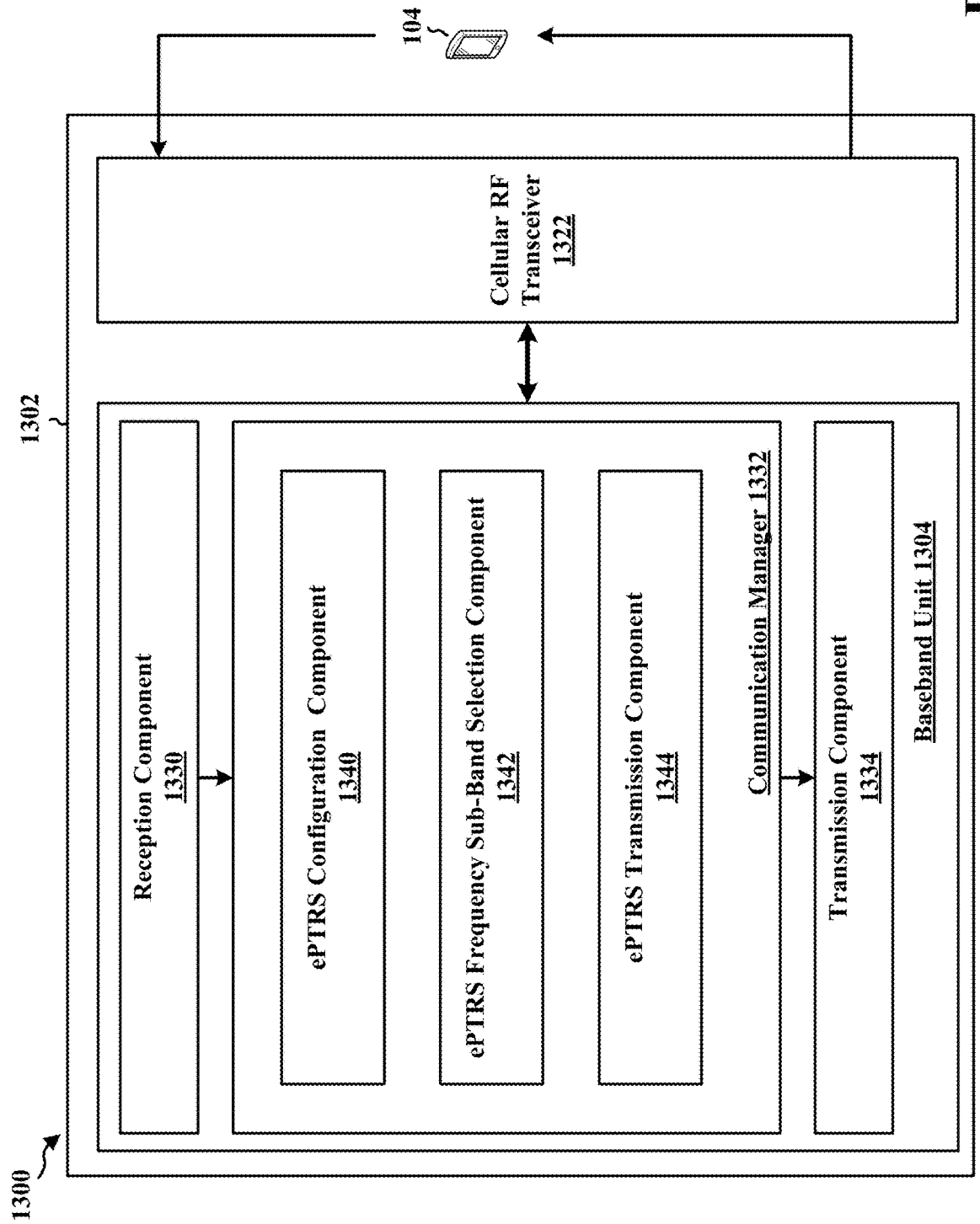
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 130 and may include the memory 376 and/or at least one of the TX processor 316, the RX processor 370, and the controller/processor 375.

The communication manager 1332 includes an ePTRS configuration component 1340 that may be configured to transmit a configuration for a plurality of frequency sub-bands associated with a contiguous FD pilot and transmit, to the UE, an indication of an allocation of one or more frequency sub-bands for a reception of a contiguous FD pilot, e.g., as described in connection with 1006, 1102, and 1108 of FIGS. 10 and 11. The communication manager 1332 further includes an ePTRS frequency sub-band selection component 1342 that may be configured to receive, from a UE, an indication of a UE capability associated with a contiguous FD pilot, e.g., as described in connection with 1002 and 1104 of FIGS. 10 and 11. The communication manager 1332 further includes an ePTRS transmission component 1344 that may be configured to transmit, to the UE, the contiguous FD pilot via the one or more allocated frequency sub-bands, e.g., as described in connection with 1008 and 1110 of FIGS. 10 and 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for receiving, from a UE, an indication of a UE capability associated with a contiguous FD pilot. The apparatus 1302, and in particular the baseband unit 1304, may include means for selecting one or more frequency sub-bands for a transmission of a contiguous FD pilot. The apparatus 1302, and in particular the baseband unit 1304, may include means for transmitting, to the UE, an indication of an allocation of the one or more frequency sub-bands for the transmission of the contiguous FD pilot. The apparatus 1302, and in particular the baseband unit 1304, may include means for transmitting, to the UE, the contiguous FD pilot via the one or more frequency sub-bands. The apparatus 1302, and in particular the baseband unit 1304, may include means for transmitting a configuration for a plurality of frequency sub-bands associated with a contiguous FD pilot. The apparatus 1302, and in particular the baseband unit 1304, may include means for transmitting an indication of an MCS associated with the one or more allocated frequency sub-bands. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

In some aspects of wireless communication, e.g., 5G NR, for high carrier frequency PN may be a dominant impairment that limits a maximum achievable throughput. PN is a multiplicative process in a time domain that may result in a cyclic convolution of the PDSCH with the corresponding PN taps in an FD. Uncompensated PN may lead to common phase error CPE and ICI related error/noise floor (e.g., a lowest achievable error rate or noise level) that can be significant in some scenarios when the integrated PN is strong enough. In some aspects of wireless communication, a PT-RS may be used to perform CPE estimation and correction but cannot be used to perform ICI estimation and correction. Thus, an uncompensated ICI may lead to an error floor (e.g., a lowest achievable error rate or noise level) that will limit the maximal throughput even after PT-RS based CPE estimation and correction (e.g., by limiting the highest operational MCS). Lack of mitigation of PN related ICI may also limit a maximal operational modulation order for mmW (e.g., 1 kQAM and even 256QAM for some PN mask scenarios). The ability to perform CPE and ICI correction for significant PN may enable an increase in the maximum achievable throughput at high SNR (e.g., to increase a throughput that may otherwise be limited because of the non-corrected PN impairments). While CPE may be estimated and corrected based on distributed pilots (e.g., a PT-RS), a contiguous pilot in FD with significant length may be beneficial for ICI estimation and correction.

Selecting a frequency sub-band for a contiguous FD pilot (e.g., an ePTRS) as described above (e.g., based on a CSI or BWP/CC characteristics) may enable ICI correction and PN reduction. Additionally, selecting an MCS as described above (e.g., based on a CSI or BWP/CC characteristics) may contribute to the PN (e.g., CPE and ICI) estimation and correction.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to transmit, to a base station, an indication of a UE capability associated with a contiguous FD pilot; receive, from the base station, an indication of an allocation of one or more frequency sub-bands for a reception of one or more contiguous FD pilots; and receive, from the base station, the one or more contiguous FD pilots via the one or more frequency sub-bands.

Aspect 2 is the apparatus of aspect 1, where the indication of the UE capability includes an indication of a UE capability associated with a contiguous FD pilot for each of a plurality of frequency bands.

Aspect 3 is the apparatus of aspect 2, where the indication for at least a first frequency band in the plurality of frequency bands includes an indication of a capability to support the contiguous FD pilot, and the indication for at least a second frequency band in the plurality of frequency bands includes an indication of a lack of support for the contiguous FD pilot.

Aspect 4 is the apparatus of any of aspects 1 to 3, where the at least one processor is further configured to transmit an indication of at least one recommended sub-band for the one or more contiguous FD pilots.

Aspect 5 is the apparatus of aspect 4, where the indication of the at least one recommended sub-band is transmitted via a CSI report.

Aspect 6 is the apparatus of any of aspects 1 to 5, where the indicated one or more frequency sub-bands are selected by a base station based on a CSI report.

Aspect 7 is the apparatus of any of aspects 1 to 6, where the indication of the allocation is received via at least one of a L2 message, a L3 message, RRC signaling, DCI, or a MAC-CE.

Aspect 8 is the apparatus of any of aspects 1 to 7, where the at least one processor is further configured to receive a configuration for a plurality of frequency sub-bands and a plurality of contiguous FD pilots, where receiving the indication of the allocation of one or more frequency sub-bands includes receiving an indication of the one or more frequency sub-bands in the plurality of frequency sub-bands associated with the one or more contiguous FD pilots.

Aspect 9 is the apparatus of any of aspects 1 to 8, where the one or more allocated frequency sub-bands for reception of the one or more contiguous FD pilots include a sub-band adjacent to a guard band.

Aspect 10 is the apparatus of any of aspects 1 to 9, where the one or more allocated frequency sub-bands for reception of the one or more contiguous FD pilots include a frequency sub-band with a channel coefficient magnitude that is greater than a threshold channel coefficient magnitude.

Aspect 11 is the apparatus of aspect 10, where the threshold channel coefficient magnitude is based on a range of channel coefficient magnitudes associated with frequency sub-bands of a frequency band including the one or more allocated frequency sub-bands.

Aspect 12 is the apparatus of any of aspects 1 to 11, where the at least one processor is further configured to receive, for each of the one or more contiguous FD pilots, an indication of an MCS associated with the contiguous FD pilot.

Aspect 13 is the apparatus of any of aspects 1 to 12, where at least one MCS associated with the one or more contiguous FD pilot is at least one of (1) implicitly signaled based on an MCS of an associated PDSCH and the UE capability indication or (2) pre-defined based on an MCS of an associated PDSCH.

Aspect 14 is the apparatus of any of aspects 1 to 13, where the contiguous FD pilot is an ePTRS and the at least one processor is further configured to perform a phase noise correction based on the received ePTRS, where performing the phase noise correction includes (1) CPE estimation and correction and (2) ICI estimation and correction.

Aspect 15 is the apparatus of any of aspects 1 to 14, further including a transceiver coupled to the at least one processor.

Aspect 16 is an apparatus for wireless communication including at least one processor coupled to a memory and configured to receive, from a UE, an indication of a UE capability associated with a contiguous FD pilot; select one or more frequency sub-bands for a transmission of one or more contiguous FD pilots; transmit, to the UE, an indication of an allocation of the one or more frequency sub-bands for the transmission of the one or more contiguous FD pilots; and transmit, to the UE, the one or more contiguous FD pilots via the one or more frequency sub-bands.

Aspect 17 is the apparatus of aspect 16, where the indication of the UE capability includes an indication of a UE capability associated with a contiguous FD pilot for each of a plurality of frequency bands.

Aspect 18 is the apparatus of aspect 17, where for at least a first frequency band in the plurality of frequency bands the indication is of a capability to support the contiguous FD pilot, and for at least a second frequency band in the plurality of frequency bands the indication is of a lack of support for the contiguous FD pilot.

Aspect 19 is the apparatus of any of aspects 16 to 18, where selecting the one or more frequency sub-bands is based on a CSI report.

Aspect 20 is the apparatus of any of aspects 16 to 19, where the indication of the allocation is transmitted via at least one of a layer 2 message, a layer 3 message, RRC signaling, DCI, or a MAC-CE.

Aspect 21 is the apparatus of any of aspects 16 to 20, where the at least one processor is further configured to transmit a configuration for a plurality of frequency sub-bands and a plurality of contiguous FD pilots, where transmitting the indication of the allocation of the one or more frequency sub-bands includes transmitting an indication of one or more frequency sub-bands in the plurality of frequency sub-bands associated with the one or more contiguous FD pilots.

Aspect 22 is the apparatus of any of aspects 16 to 21, the one or more allocated frequency sub-bands for the transmission of the one or more contiguous FD pilots include a sub-band adjacent to a guard band.

Aspect 23 is the apparatus of any of aspects 16 to 22, where the one or more allocated frequency sub-bands for the transmission of the one or more contiguous FD pilots include a frequency sub-band with a channel coefficient magnitude that is greater than a threshold channel coefficient magnitude.

Aspect 24 is the apparatus of aspect 23, where the threshold channel coefficient magnitude is based on a range of channel coefficient magnitudes associated with frequency sub-bands of a frequency band including the one or more allocated frequency sub-bands.

Aspect 25 is the apparatus of any of aspects 16 to 24, where the at least one processor is further configured to transmit, for each of the one or more contiguous FD pilots, an indication of an MCS associated with the contiguous FD pilot.

Aspect 26 is the apparatus of any of aspects 16 to 25, where at least one MCS associated with the one or more contiguous FD pilots is at least one of (1) implicitly signaled based on an MCS of an associated PDSCH and the UE capability indication or (2) pre-defined based on an MCS of an associated PDSCH.

Aspect 27 is the apparatus of any of aspects 16 to 26, where the one or more frequency sub-bands are selected from a set of candidate frequency sub-bands in a frequency band based on at least one of (1) a frequency selectivity of each frequency sub-band in the set of candidate frequency sub-bands, (2) spur locations at each frequency sub-band in the set of candidate frequency sub-bands, (3) amplitude droop characteristics of each frequency sub-band in the set of candidate frequency sub-bands.

Aspect 28 is the apparatus of any of aspects 16-28, further including a transceiver coupled to the at least one processor.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication, comprising:
   a memory; and
   at least one processor coupled to the memory and configured to:
   transmit, to a base station, an indication of a capability of the apparatus to support a contiguous frequency domain (FD) pilot in each of a plurality of frequency bands;
   receive, from the base station, an allocation indication of an allocation of one or more frequency sub-bands of at least one frequency band in the plurality of frequency bands for a reception of one or more contiguous FD pilots; and
   receive, from the base station, the one or more contiguous FD pilots via the one or more frequency sub-bands.

2. The apparatus of claim 1, wherein the indication of the capability of the apparatus comprises, for at least a first frequency band in the plurality of frequency bands, a first indication of support for the contiguous FD pilot, and, for at least a second frequency band in the plurality of frequency bands, a second indication of a lack of support for the contiguous FD pilot.

3. The apparatus of claim 1, wherein the at least one processor is further configured to transmit an additional indication of at least one recommended frequency sub-band.

4. The apparatus of claim 3, wherein the additional indication of the at least one recommended frequency sub-band is transmitted via a channel state information (CSI) report.

5. The apparatus of claim 4, wherein the one or more frequency sub-bands are selected by the base station based on at least one of the CSI report or the additional indication of the at least one recommended frequency sub-band.

6. The apparatus of claim 1, wherein the at least one processor is configured to receive the allocation indication via at least one of a layer 2 (L2) message, a layer 3 (L3) message, radio resource control (RRC) signaling, downlink control information (DCI), or a medium access control (MAC) control element (MAC-CE).

7. The apparatus of claim 1, wherein the at least one processor is further configured to receive a configuration for a plurality of frequency sub-bands comprising the one or more frequency sub-bands and a plurality of contiguous FD pilots comprising the one or more contiguous FD pilots, wherein to receive the allocation indication, the at least one processor is configured to receive an indication of the one or more frequency sub-bands in based on the configuration for the plurality of frequency sub-bands.

8. The apparatus of claim 1, wherein the one or more frequency sub-bands for reception of the one or more contiguous FD pilots comprise a sub-band adjacent to a guard band.

9. The apparatus of claim 1, wherein the one or more frequency sub-bands for reception of the one or more contiguous FD pilots comprise a frequency sub-band with a channel coefficient magnitude that is greater than a threshold channel coefficient magnitude.

10. The apparatus of claim 9, wherein the threshold channel coefficient magnitude is based on a range of channel coefficient magnitudes associated with frequency sub-bands of a frequency band including the one or more frequency sub-bands.

11. The apparatus of claim 1, wherein the at least one processor is further configured to receive, for each of the one or more contiguous FD pilots, an additional indication of a modulation and coding scheme (MCS) associated with the contiguous FD pilot.

12. The apparatus of claim 1, wherein at least one modulation and coding scheme (MCS) associated with the one or more contiguous FD pilots is at least one of (1)

implicitly signaled based on a first MCS of a first associated physical downlink shared channel (PDSCH) and the indication of the capability of the apparatus or (2) pre-defined based on a second MCS of a second associated PDSCH.

13. The apparatus of claim 1, wherein each contiguous FD pilot of the one or more contiguous FD pilots is an enhanced phase tracking reference signal (ePTRS) and the at least one processor is further configured to perform a phase noise correction based on the ePTRS, wherein performing the phase noise correction comprises (1) common phase error (CPE) estimation and correction and (2) inter-carrier-interference (ICI) estimation and correction.

14. The apparatus of claim 1, further comprising a transceiver coupled to the at least one processor.

15. An apparatus for wireless communication, comprising:
 a memory; and
 at least one processor coupled to the memory and configured to:
  receive, from a user equipment (UE), an indication of a UE capability to support a contiguous frequency domain (FD) pilot in each of a plurality of frequency bands;
  select one or more frequency sub-bands of at least one frequency band in the plurality of frequency bands for a transmission of one or more contiguous FD pilots;
  transmit, to the UE, an allocation indication of an allocation of the one or more frequency sub-bands for the transmission of the one or more contiguous FD pilots; and
  transmit, to the UE, the one or more contiguous FD pilots via the one or more frequency sub-bands.

16. The apparatus of claim 15, wherein the indication of the UE capability comprises, for at least a first frequency band in the plurality of frequency bands, a first indication of a capability to support the contiguous FD pilot, and, for at least a second frequency band in the plurality of frequency bands, a second indication of a lack of support for the contiguous FD pilot.

17. The apparatus of claim 15, wherein the at least one processor is configured to select the one or more frequency sub-bands based on a channel state information (CSI) report.

18. The apparatus of claim 15, wherein the at least one processor is configured to transmit the allocation indication via at least one of a layer 2 message, a layer 3 message, radio resource control (RRC) signaling, downlink control information (DCI), or a medium access control (MAC) control element (MAC-CE).

19. The apparatus of claim 15, wherein the at least one processor is further configured to transmit a configuration for a plurality of frequency sub-bands comprising the one or more frequency sub-bands and a plurality of contiguous FD pilots comprising the one or more contiguous FD pilots, wherein to transmit the allocation indication, the at least one processor is configured to transmit an indication of the one or more frequency sub-bands based on the configuration for the plurality of frequency sub-bands.

20. The apparatus of claim 15, wherein the one or more frequency sub-bands for the transmission of the one or more contiguous FD pilots comprise a sub-band adjacent to a guard band.

21. The apparatus of claim 15, wherein the one or more frequency sub-bands for the transmission of the one or more contiguous FD pilots comprise a frequency sub-band with a channel coefficient magnitude that is greater than a threshold channel coefficient magnitude.

22. The apparatus of claim 21, wherein the threshold channel coefficient magnitude is based on a range of channel coefficient magnitudes associated with frequency sub-bands of a frequency band including the one or more frequency sub-bands.

23. The apparatus of claim 15, wherein the at least one processor is further configured to transmit, for each of the one or more contiguous FD pilots, an additional indication of a modulation and coding scheme (MCS) associated with the contiguous FD pilot.

24. The apparatus of claim 15, wherein at least one modulation and coding scheme (MCS) associated with the one or more contiguous FD pilots is at least one of (1) implicitly signaled based on a first MCS of a first associated physical downlink shared channel (PDSCH) and the indication of the UE capability or (2) pre-defined based on a second MCS of a second associated PDSCH.

25. The apparatus of claim 15, wherein the one or more frequency sub-bands are selected from a set of candidate frequency sub-bands in a frequency band based on at least one of (1) a frequency selectivity of each frequency sub-band in the set of candidate frequency sub-bands, (2) spur locations at each frequency sub-band in the set of candidate frequency sub-bands, (3) amplitude droop characteristics of each frequency sub-band in the set of candidate frequency sub-bands.

26. The apparatus of claim 15, further comprising a transceiver coupled to the at least one processor.

27. A method of wireless communication at a user equipment (UE), comprising:
 transmitting, to a base station, an indication of a UE capability to support a contiguous frequency domain (FD) pilot in each of a plurality of frequency bands;
 receiving, from the base station, an allocation indication of an allocation of one or more frequency sub-bands of at least one frequency band in the plurality of frequency bands for a reception of one or more contiguous FD pilots; and
 receiving, from the base station, the one or more contiguous FD pilots via the one or more frequency sub-bands.

28. A method of wireless communication at a base station, comprising:
 receiving, from a user equipment (UE), an indication of a UE capability to support a contiguous frequency domain (FD) pilot in each of a plurality of frequency bands;
 selecting one or more frequency sub-bands of at least one frequency band in the plurality of frequency bands for a transmission of one or more contiguous FD pilots;
 transmitting, to the UE, an allocation indication of an allocation of the one or more frequency sub-bands for the transmission of the one or more contiguous FD pilots; and
 transmitting, to the UE, the one or more contiguous FD pilots via the one or more frequency sub-bands.

* * * * *